July 16, 1963  P. WINCHELL  3,097,366
ARTIFICIAL HEART
Filed Feb. 6, 1961  4 Sheets-Sheet 1
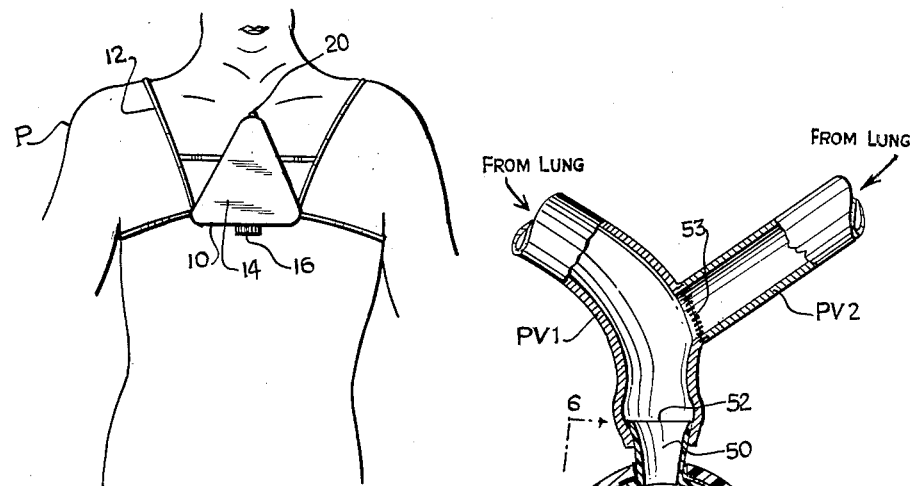
Fig. 1.
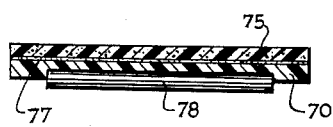
Fig. 4.
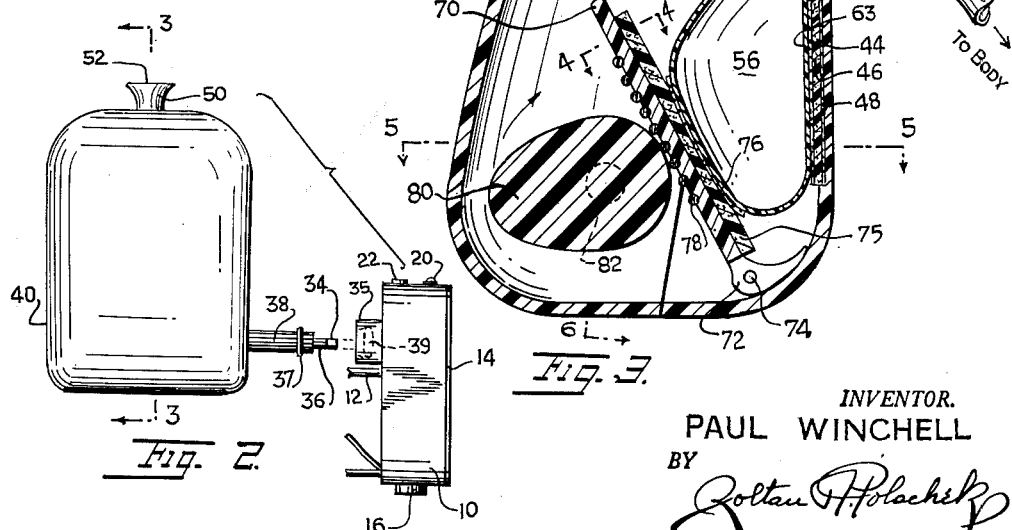
Fig. 2.
Fig. 3.
INVENTOR.
PAUL WINCHELL
BY
Zoltan H. Holschek
ATTORNEY

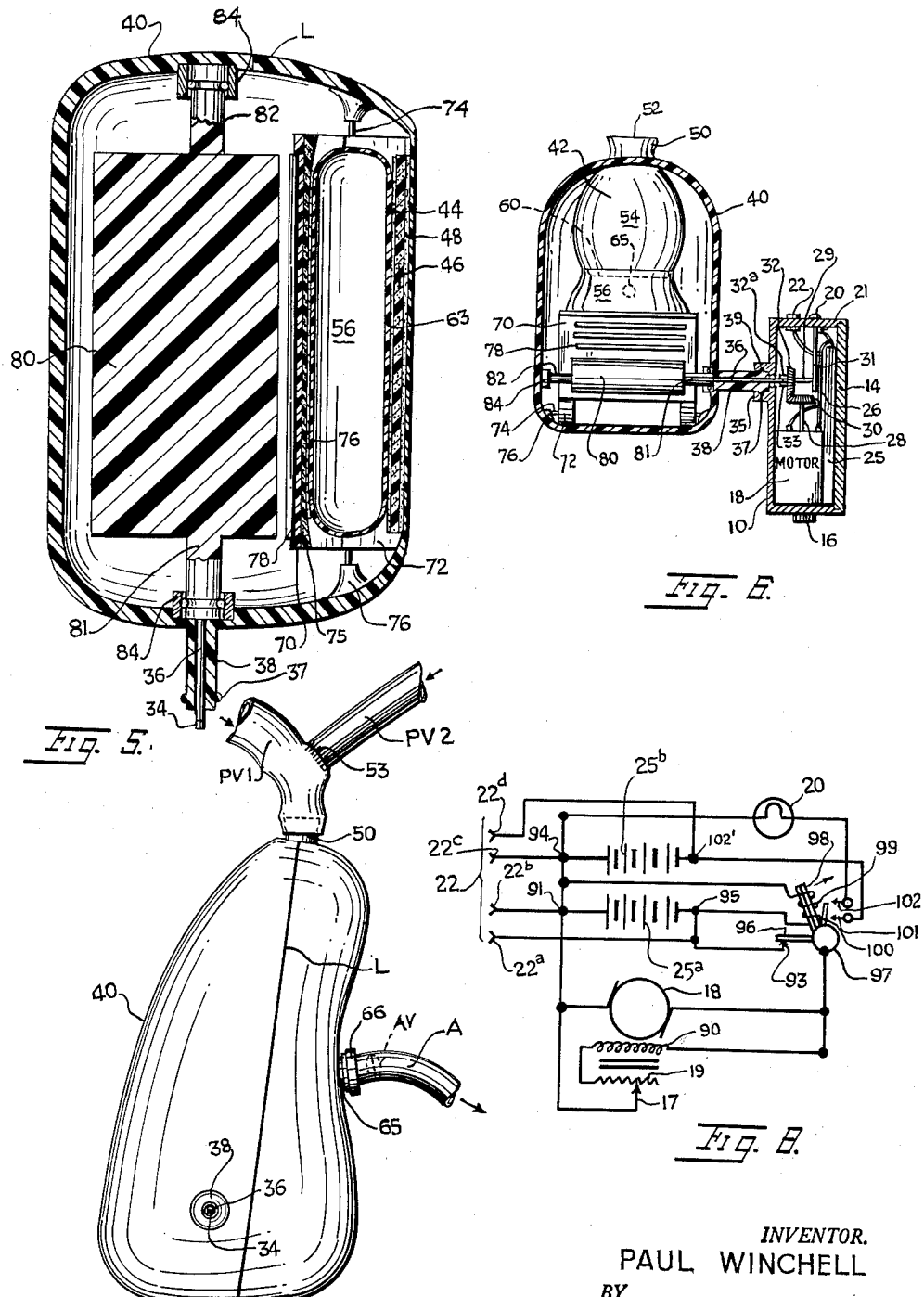

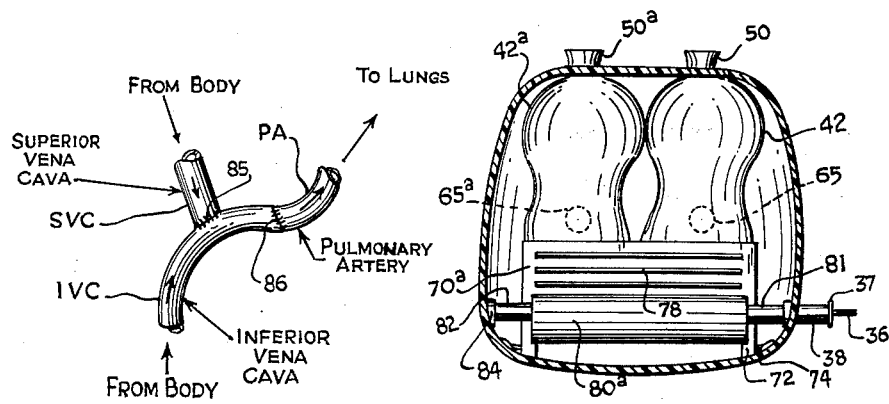
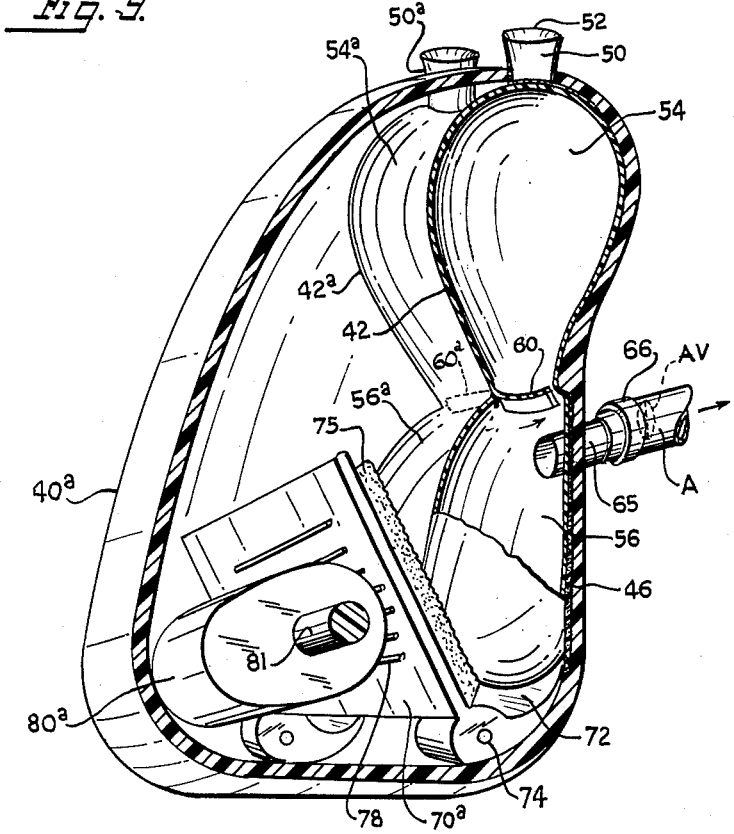

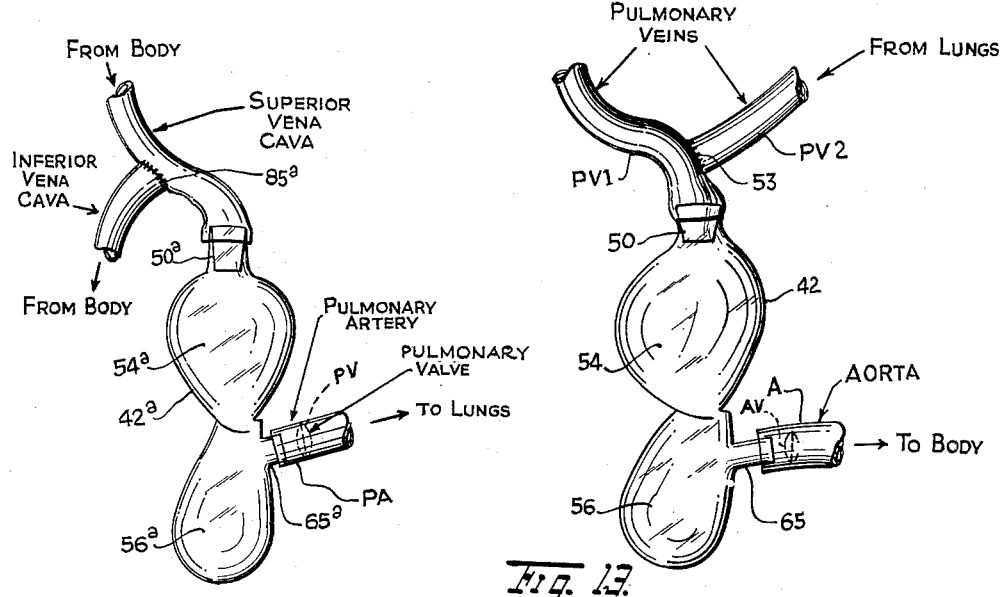
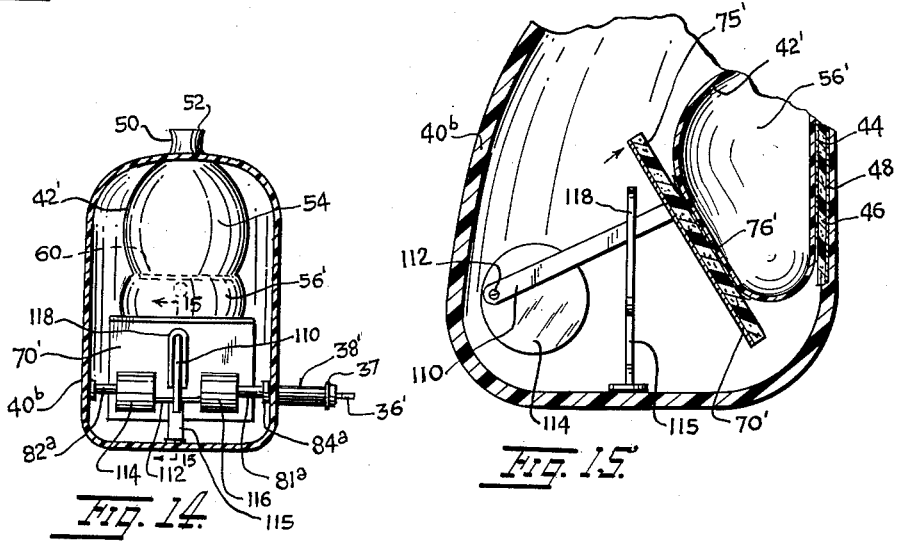
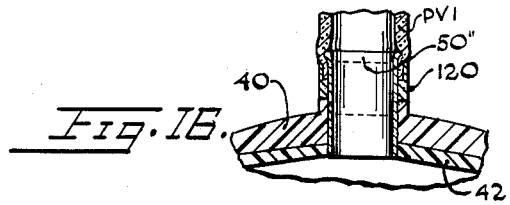
INVENTOR.
PAUL WINCHELL
BY
*Zoltan H. Polachek*
ATTORNEY United States Patent Office 3,097,366
Patented July 16, 1963

3,097,366
ARTIFICIAL HEART
Paul Winchell, Whitestone, N.Y., assignor to Chelwin Productions, Inc., New York, N.Y., a corporation of New York
Filed Feb. 6, 1961, Ser. No. 87,233
5 Claims. (Cl. 3—1)

This invention relates to an artificial heart and more particularly to an artificial heart capable of substituting for a natural human heart in moving blood through a human body.

A principal object of the invention is therefore to provide an artificial heart adapted to be mounted in the mediastinum in the chest of a human or animal as a total replacement for the original human or animal heart.

It is another object of the invention to provide an artificial heart in which the moving parts are sealed within a container made of a material which is nontoxic and nonirritating to the human or animal body and inert with respect to body fluids, the several moving parts being made of tough, durable material which will not wear out in use, such as nylon, and the like.

A further feature of the invention resides in the provision of a mechanical heart system for installation in the human or animal body, embodying an artificial heart as such, with an electric motor for driving the heart disposed outside the body with a drive shaft for the artificial heart extending through the body from the artificial heart to the motor carried externally of the body, all elements of the apparatus contained within the body being insulated or covered with material inert to body fluids.

The present invention contemplates an artificial heart that can be mounted inside the body of a patient as a replacement or substitute for a removed heart so that the patient may live a substantially normal as well as a moderately active life for an indefinite period of time.

The invention furthermore contemplates an artificial heart of the character described wherein the blood never contacts any moving parts other than its own container and valve or valves within the heart.

Another feature of the invention is the provision of an artificial heart made of suitable plastic parts to minimize the strain on the internal body parts supporting the artificial heart, the artificial heart having a drive motor and power supply supported on the chest of the user by a harness external to the body.

Yet another feature is the provision of a mechanical heart of the character described with automatic switching means to a reserve power supply, and with signal means to indicate deactivation of the main power supply.

Still a further feature is an artificial heart that occupies within the mediastinum space and that operates continually for an indefinitely long period of time.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a front view of the device mounted at the chest of a person.

FIG. 2 is an exploded side elevational view of the heart and drive motor casings.

FIG. 3 is a sectional view on an enlarged scale taken on line 3—3 of FIG. 2, with blood vessels shown connected to the device.

FIGS. 4 and 5 are sectional views taken on lines 4—4 and 5—5, respectively, of FIG. 3.

FIG. 6 is a sectional view on a reduced scale taken on line 6—6 of FIG. 3, with the motor casings shown.

FIG. 7 is a front elevational view of one part of the device.

FIG. 8 is a diagram of a circuit employed in the electrical system of the device.

FIG. 9 is a diagrammatic illustration of surgical connections of blood vessels made in connection with installation of the device.

FIG. 10 is a sectional view similar to a portion of FIG. 6 illustrating another form of the invention.

FIG. 11 is an enlarged perspective view partially in section of part of the embodiment of FIG. 10.

FIGS. 12 and 13 are diagrammatic illustrations of portions of the embodiment of FIG. 10 showing blood vessels connected thereto.

FIG. 14 is a sectional view similar to FIG. 10 showing another embodiment of the invention.

FIG. 15 is a sectional view on an enlarged scale taken on line 15—15 of FIG. 14.

FIG. 16 is a sectional detail view of the connection between a vein and bladder.

Referring to FIG. 1, there is shown a person P carrying a suitable, triangular motor and battery casing 10 held by harness straps 12 upon his chest. The casing has a removable cover 14; see FIGS. 1, 2 and 6. At the bottom of the casing is a knob 16 which permits controlling the speed of operation of a motor 18 disposed inside the casing 10. On top of the casing 10 is a lamp 20 and a socket 22, wired into the electrical system of the device.

A plurality of batteries 25$^a$ and 25$^b$ are disposed in a compartment 25 in the casing and connected by wires 26 to the motor 18, lamp base 21 and socket 22. The motor has a rotating shaft 28 on which is a small bevel gear 30 meshed with another bevel gear 32 carried on a stub shaft 29 and supported by a bracket 31 in the case. Gear 32 has a hub 32$^a$ with a square recess 33 which receives the square end 34 of a shaft 36, extending outwardly of the casing through a tubular extension 38 formed on the front side of the artificial heart casing 40; see FIGS. 2 and 6.

The tubular extension 38 may extend through the chest or other portion of the body of the person and is detachably locked in a nipple 35 formed at the rear of casing 10. A bead 37 on the end of the extension 38 engages in a groove 39 formed in the nipple. The tubular extension and the drive shaft 36 may be formed of either flexible or non-flexible material.

The casing 40 constitutes the internal body portion of the mechanical heart. This casing as formed of plastic material which is impervious to body fluids, which material may be transparent. A suitable material for the purpose may be nylon, polyethylene, vinyl or the like. It is molded with smooth contours, corners and edges to fit comfortably within the hearty cavity of the person or animal in which it is installed.

Within the casing 40 there is a flexible bag 42 or bladder formed of plastic material such as vinyl or polyethylene. The bladder may be coated internally with a suitable silicone to reduce surface tension of the blood and prevent formation of air bubbles in the bladder. The bladder is secured at one side by a layer of cement 44 to a spongy plastic cushion or mat 46 cemented by an adhesive layer 48 to the inner surface of the wall of casing 40. The cement 44 extends up to the top of the bag where there is an integrally formed flaring nipple 50 forming an atrial orifice for the artificial heart. The nipple has a thin feathered edge 52 flaring slightly at the tip to fit flush with the inside of pulmonary vein PV1 shown engaged on the nipple 50 in FIGS. 3 and 7. The feathering of edge 52 helps to prevent the formation of clots or embolism in the circulatory system. The second pulmonary vein PV2 is anastomosed at 53 to the first pulmonary vein PV1.

Bladder 42 is divided into upper and lower chambers 54, 56. The upper chamber 54 is slightly larger than the lower chamber 56 with the upper chamber holding about five ounces of blood while the lower chamber holds about four ounces. The upper chamber simulates an atrium of a natural heart and the lower chamber simulates a ventricle. A flap valve 60 opens into the lower chamber and is closed by pressure against a ledge 62 formed on the ventricular wall 63 of the lower chamber. Valve 60 simulates a mitral valve in a natural heart. A nipple 65 extends outwardly of the ventricular wall 63 through the wall of casing 40. To this nipple may be secured by a surgical clamp 66 one end of the aorta A. The aorta is secured so that the natural aortic valve AV is located just beyond the nipple 65 and can operate in normal manner.

A pressure plate 70 is pivotally mounted on springy curved legs 72 secured by pintles 74 to bosses 76 located at the bottom of the casing 40. One side of the plate carries a cushion or pad 75 abutting bladder 42 and secured to the lower portion 56 by cement 76. Cement layer 77 secures pad 75 to the plate. Roller bearings 78 are rotatably mounted in the other side of the plate 70. These bearings are preferably made of nylon or the like to insure long trouble-free useful life. A nylon cam roller 80 is rotatably mounted on axles 81, 82 journaled in ball bearing races 84 at opposite sides of the casing 40. Shaft 36 is integral with axle 81 and serves to rotate the cam roller against the plate 70 during operation of the device. The casing 40 may be formed in two parts joined on line L. The two parts may be joined after the device is installed and it is determined that all parts inside casing 40 operate properly.

FIG. 9 illustrates diagrammatically surgical connections which would be made between the inferior vena cava IVC, superior vena cava SVC, and pulmonary artery PA with pulmonary valve removed by sutured anastomosis at connections 85, 86.

In operation of the device, fresh blood arriving at the casing 40 from the lungs will fill upper chamber 54. The expansion of the lower chamber 56 will cause it to gradually and smoothly draw into that chamber 56 through open valve 60. The blood will enter the lower chamber as the smaller radius of roller 80 reaches plate 70, as shown in FIG. 3. Roller 80 will be driven continuously by motor 18 so that the portion of larger radius will drive the plate 70 inwardly to compress chamber 56 and exhaust the blood into the aorta. The blood arriving back from the body through the inferior and superior vena cava veins will pass to the lungs directly through the pulmonary artery whose valve has been removed and to which the veins are connected, as indicated in FIG. 9. As the roller 80 continues to turn, the plate 70 will be retracted to expand chamber 56 and permit more blood which has meanwhile arrived from the lungs in chamber 54 to enter chamber 56.

FIG. 8 illustrates the circuit diagram employed in the electrical system. The knob 16 controls a movable tap 17 on a resistor 19 connected to series with the field coil 90 of motor 18. The motor is connected to terminal 91 of the main batteries 25$^a$ and terminal 94 of a reserve set of batteries 25$^b$. Terminal 95 of batteries 25$^a$ is connected to the motor and field coil via a contact 93 closed with contact 96 of a thermostat switch 97. This switch has bimetallic elements 98 carrying a resistance coil 99. Coil 99 is connected across the batteries 25$^a$. While the batteries 25$^a$ have the proper voltage and are delivering sufficient current to the motor coil 99 will be heated and elements 98 will bend as indicated in FIG. 8 to close contacts 93, 96. The switch 97 has another contact 100 normally open with respect to fixed contacts 101, 102. Contact 101 is connected to terminal 102' of batteries 25$^b$. Contact 102 is connected to lamp 20 and terminal 94.

If the voltage of batteries 25$^a$ drops below a predetermined value, the current in resistance coil 99 will decrease, permitting the elements 98 to cool and bend angularly (to the right in FIG. 8) so that contact 100 closes with contacts 101, 102. This opens the circuit of batteries 25$^a$ and closes the circuit of batteries 25$^b$. Lamp 20 lights up indicating that the system is now operating with the reserve batteries 25$^b$. Instead of a lamp a buzzer or other suitable warning device may be used. Batteries 25$^a$ are deactivated. The batteries 25$^a$ can be recharged via terminals 22$^a$, 22$^b$ by plugging a suitable source of current into the socket 22 on top of the casing 10. This may be done conveniently without interrupting operation of the motor and heart mechanism. When batteries 25$^a$ are recharged the coil 99 will become heated sufficiently to switch the connections automatically back to the main power supply 25$^a$ by closing contacts 93, 96 and opening contacts 100—102. The batteries 25$^b$ can be recharged via terminals 22$^c$ and 22$^d$ of the socket 22 so that a fully charged reserve power supply is always available. While batteries 25$^a$ are being recharged from the external power supply, coil 99 may be heated sufficiently to switch off the reserve batteries 25$^b$. This will do no harm since the motor 18 will now be driven off the external power supply. If desired, the batteries 25$^a$ and 25$^b$ can be removed and replaced with fresh batteries instead of being recharged.

In FIGS. 10–13 there is illustrated another form of the invention in which parts corresponding to those in FIGS. 2–7 are similarly numbered. In casing 40$^a$ there are disposed two bladders 42 and 42$^a$. Bladder 42 has upper and lower chambers 54, 56 as explained above and its nipple 65 is anastomosed to the aorta A. The casing 40$^a$ is somewhat wider than casing 40 to accommodate bladder 42$^a$ which is disposed alongside bladder 42. The pulmonary veins connected to nipple 50 are sutured together at 53 as indicated in FIG. 13. This figure may also be taken as a diagrammatic representation of the bladder 42 of FIGS. 1–7. FIG. 12 shows nipple 50$^a$ of the upper chamber 54$^a$ of bladder 42$^a$ secured to the superior vena cava to which the inferior vena cava is secured at 85$^a$. The pulmonary artery is secured to nipple 65$^a$ which opens into the lower chamber 56$^a$ of bladder 42$^a$. The pulmonary valve PV in this four-chambered heart is left intact in surgically connecting the pulmonary artery to nipple 65$^a$, contrary to the procedure of removing same when installing a two-chambered heart.

The artificial heart employing the arrangement of FIGS. 10–13 is similar to that described in connection with FIGS. 1–7, except that the pressure plate 70$^a$ which is secured to both bladders 42, 42$^a$ permits both lower chambers 56, 56$^a$ to expand and receive blood from the upper chambers 54, 54$^a$, respectively, via valves 60, 60$^a$. As the lower chambers expand more blood arrives from the lungs to fill chamber 54 while more blood arrives from the body to fill chamber 54$^a$. When the cam roller 80$^a$ rotates to compress the lower chambers, the blood is gradually squeezed out from chamber 56 into the aorta A and from chamber 56$^a$ into the pulmonary artery PA, thereby simultaneously closing both flap valves 60 and 60$^a$. Casing 10, as shown in FIGS. 1 and 2 containing motor 18 will be employed to furnish the motor power for turning the roller 80$^a$.

FIGS. 14 and 15 illustrate another drive arrangement for a pressure plate 70' which may be employed for driving the single bladder 42' or the two bladders 42, 42$^a$ of FIGS. 10–13. Plate 70' carries pad 75' secured by cement 76' to bladder 42' at its lower chamber 56'. The plate 70' is secured to one end of a link 110 engaged at its other end on a roller crankshaft 112. The shaft 112 is secured eccentrically to rollers 114, 116 carried on axles 81$^a$, 82$^a$ journaled in bearing races 84$^a$. Shaft 36' is secured to axle 81$^a$ and extends outwardly axially of extension 38' of casing 40$^b$. A stationary yoke bracket 115 has a loop 118 in which the link 110 is slidably mounted for guiding the link in driving the plate 70' toward and away from the bladder 42' as the rollers 114, 116 rotate. The motor assembly in casing 10 shown in FIGS. 1 and 2 would be used to drive the roller crank 112.

The rheostat control 16 in casing 10 permits the artificial heart to be controlled in speed of operation between fast and slow limits. For rest or sleep the patient can set the motor 18 to rotate slower and for normal activities the motor can be set to run faster. Suitable stop pins or other abutments will control minimum and maximum adjustments of the motor speed.

The heart casings 40, 40ª and 40ᵇ will be installed surgically by a competent surgical team after removal of the natural heart with the aid of a heart lung machine used on the patient. The tubular extensions 38, 38' will be disposed so that the beaded ends project out of the body at the place selected by the surgeon. The casing 10 may be worn exposed outside the clothing if desired. The heart casing 40, 40ª or 40ᵇ will be secured and supported in the body by appropriate wiring and coupling members, such as by wiring to the ribs, by attaching to the spine with clamps, by anchoring with silver screws to any suitable bones.

The device is so constructed that at periodic intervals the motor can be inspected, cleaned and oiled. The casing 10 can be detached from the internal heart casing if required by disengagement of the tubular extensions 38, 38' from the nipple 35 and of shaft 36 from hub 32ª. A substitute casing 10 will be at hand to be snapped into place immediately upon removal of the casing 10 to be serviced. This may be done by a physician or attendant. It is even possible to attach a crank, wrench or other hand tool to the exposed end 34 of shaft 36 to operate the device manually in an emergency.

It will be noted that all driving parts of the device are located outside the body. The parts inside the body are hermetically sealed and intended for indefinite useful life, normally exceeding the normal life expectancy of the person or animal in which the device is installed. The blood circulation system is hermetically sealed off from the interior of casing 40, 40ª and 40ᵇ and from the motor casing 10.

FIG. 16 shows a manner of connecting a nipple 50", constituting an orifice for the artificial heart, to the pulmonary vein PV1 by stretching the end of the vein over the end of the nipple and clamping the parts in place by a surgeon's clamp 120.

Suitable permanent lubrication may be provided by packing and sealing wherever needed.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A mechanical heart substitute for a natural heart, comprising a first impermeable casing of material compatible with the tissue of the body of a living being, and of a size to fit within the chest cavity of a living being after removal of the natural heart, said casing having spaced openings, a squeezing mechanism in the casing to circulate blood through the body and lungs of said living being, nipples extending through the openings in the casing for connection at one end to natural blood vessels, motor drive means arranged to be worn externally of said living being, another casing adapted to be supported externally on the chest of a living being, said other casing enclosing said motor drive means, drive shaft means connecting the motor drive means and said mechanism, said first casing having a tubular extension arranged to extend through one of said openings and to exit from the body of said living being and detachably connected to said other casing, said drive shaft being axially disposed in said tubular extension, at least one flexible, sealed, plastic bag disposed in said first casing, said bag having upper and lower chambers, said bag having openings therein, valve means between the chambers adapted to close when pressure is exerted upon the lower chamber and to open upon release of said pressure, the other end of the nipples being connected to the openings in the bag in hermetic seals therewith, said nipples communicating with the bag on each side of the valve means, said mechanism comprising a pivotally mounted spring-biased plate disposed alternately to compress and release said lower chamber, a roller abutting said plate to control reciprocal movement of the plate, said drive shaft being operatively connected to the roller for rotation thereof, two sets of batteries disposed in said other casing, first electric circuit means normally connecting one set of batteries to the motor to energize the same, and automatic switch means for deactivating one set of batteries and connecting the other set of batteries to the motor when one set of batteries falls in voltage below a predetermined magnitude.

2. A mechanical heart substitute for a natural heart, comprising a first impermeable casing of material compatible with the tissue of the body of a living being, of a size to fit within the chest cavity of a living being after removal of the natural heart, said casing having spaced openings, a squeezing mechanism in the casing to circulate blood through the body and lungs of said living being, nipples extending through the openings in the casing for connection at one end to natural blood vessels, motor drive means arranged to be worn externally of said living being, another casing adapted to be supported externally on the chest of a living being, said other casing enclosing said motor drive means, drive shaft means connecting the motor drive means and said mechanism, said first casing having a tubular extension arranged to extend through one of said openings and to exit from the body of said living being and detachably connected to said other casing, said drive shaft being axially disposed in said tubular extension, at least one flexible, sealed, plastic bag disposed in said first casing, said nipples being connected to the bag in hermetic seals therewith, said mechanism comprising a pivotally mounted spring biased plate disposed alternately to compress and to release said bag, a roller abutting said plate to control reciprocal movement of the plate, said drive shaft being operatively connected to the roller for rotation thereof, said bag being divided into a larger upper chamber and a smaller lower chamber, and a one-way valve located in the lower chamber so that blood flows from the upper chamber to the lower chamber in a smooth natural manner, and the blood flows from the lower chamber under pressure of said plate to one of said blood vessels, said nipples communicating with the bag on each side of the valve, said squeezing mechanism including said pressure plate movable against the lower chamber of the bag.

3. A mechanical heart comprising an impermeable casing of material compatible with the tissue of the body of a living being, said casing having spaced openings, a squeezing mechanism in the casing to circulate blood through the body and lungs of a living being, nipples extending through the openings in the casing for connection at one end to natural blood vessels of said living being, at least one chambered flexible bag connected to certain of said nipples in hermetic seal therewith, said bag having upper and lower chambers, valve means between the chambers adapted to close when pressure is exerted upon the lower chamber and to open upon release of said pressure, said squeezing mechanism comprising a pivotally mounted spring-biased plate disposed to compress and to release said bag, a camming roller abutting the plate and controlling reciprocal movement thereof when the roller is turned, and a drive shaft operatively connected to the roller for turning the same, said drive shaft extending outside of the casing, drive means operatively connected to said drive shaft, said drive means adapted to be supported on the chest of a living being, opposite ends of said roller being journaled in a ball bearing recess at opposite ends of said casing, substantially frictionless roller bearings between said plate and said roller, opposite ends of said roller being journaled in said plate and abutting said roller, and resilient pads interposed between and secured to the bag and casing and both the plate and casing, said nipples communicating with the bag on each side of the valve means, said squeezing mechanism including said pressure plate movable against the lower chamber of the bag.

4. A mechanical heart to act as a substitute for a natural heart, comprising an impermeable casing of material compatable with the tissue of the body of a human and of a size to fit within the chest cavity of a human after removal of the natural heart, said casing having spaced openings, a sectional bladder in said casing including an upper chamber and a lower chamber, a wall forming part of said lower chamber, a ledge on said wall, pumping mechanism in said casing associated with said bladder to circulate blood in simulation of the natural heart, a nipple communicating with the interior of said upper chamber and extending through one of the openings in said casing for connection to natural blood vessels, a flap valve adjacent the juncture of the upper and lower chambers for controlling the flow of blood, said flap valve being movable against said ledge to close communication between the upper and lower chambers, a nipple communicating with the lower chamber and extending through another opening in said casing for connection to a natural blood vessel, another casing arranged to be worn externally of said human, means of operative connection between said casings, said means adapted to exit from the body of said human, drive means in the other casing to actuate said pumping mechanism, power supply means for said drive means connected thereto through said other casing, said power supply means including wires connected to a source of electrical energy, said pumping mechanism including a pressure plate movable against the lower section of said bladder.

5. A mechanical heart to act as a substitute for a natural heart, comprising an impermeable casing of material compatible with the tissue of the body of a human and of a size to fit within the chest cavity of a human after removal of the natural heart, said casing having spaced openings, a sectional bladder in said casing including an upper chamber and a lower chamber, a wall forming part of said lower chamber, a ledge on said wall, pumping mechanism in said casing associated with said bladder to circulate blood in simulation of the natural heart, a nipple communicating with the interior of said upper chamber and extending through one of the openings in said casing for connection to natural blood vessels, a flap valve adjacent the juncture of the upper and lower chambers for controlling the flow of blood, said flap valve being movable against said ledge to close communication between the upper and lower chambers, a nipple communicating with the lower chamber and extending through another opening in said casing for connection to a natural blood vessel, another casing arranged to be worn externally of said human, means of operative connection between said casings adapted to exit from the body of said human, drive means in the other casing to actuate said pumping mechanism, power supply means for said drive means connected thereto through said other casing, said power supply means including wires connected to a source of electrical energy, said pumping mechanism including a pressure plate movable against the lower section of said bladder, a camming roller engageable against said pressure plate and means for rotating said camming roller.

References Cited in the file of this patent

UNITED STATES PATENTS

| | | |
|---|---|---|
| 1,893,776 | Hull | Jan. 10, 1933 |
| 2,845,874 | Mangle | Aug. 5, 1958 |
| 2,917,751 | Fry | Dec. 22, 1959 |

FOREIGN PATENTS

| | | |
|---|---|---|
| 1,195,011 | France | May 11, 1959 |